United States Patent

[11] 3,576,175

| [72] | Inventor | Lawrence A. Gammill<br>Colorado Springs, Colo. |
|---|---|---|
| [21] | Appl. No. | 808,937 |
| [22] | Filed | Mar. 20, 1969 |
| [45] | Patented | Apr. 27, 1971 |
| [73] | Assignee | Hewlett-Packard Company<br>Palo Alto, Calif. |

[54] CONDITION INDICATOR
4 Claims, 6 Drawing Figs.

[52] U.S. Cl. ............................................. 116/124,
116/114, 116/131, 200/167
[51] Int. Cl. ............................................. G09f 9/00
[50] Field of Search............................................. 116/114,
116, 124, 130, 131; 200/42, 167

[56] References Cited
UNITED STATES PATENTS

| 1,763,225 | 6/1930 | Davis.......................... | 116/124UX |
| 3,084,659 | 4/1963 | Griffin......................... | 116/124 |
| 3,250,887 | 5/1966 | Sorenson...................... | 200/167 |
| 3,267,234 | 8/1966 | Stewart et al................. | 200/167X |
| 3,312,794 | 4/1967 | Hollyday...................... | 200/42 |
| 3,508,519 | 4/1970 | Campbell...................... | 116/124 |

FOREIGN PATENTS

| 968,276 | 9/1964 | Great Britain................ | 200/167 |
| 1,087,225 | 8/1960 | Germany...................... | 200/167 |

*Primary Examiner*—Louis J. Capozi
*Attorney*—Stephen P. Fox

ABSTRACT: A pushbutton which has a magnifying lens front houses an internal display flag operated by a cam follower. The cam follower in turn is operated by the axial movement of the pushbutton relative to the instrument housing containing the pushbutton. The magnifying lens permits words or symbols printed on the display flag and appearing behind the lens to be greatly magnified. The particular sets of words or symbols appearing behind the magnifying portion of the lens are greatly emphasized and appear more readily to the viewer in front of the instrument panel.

PATENTED APR 27 1971          3,576,175
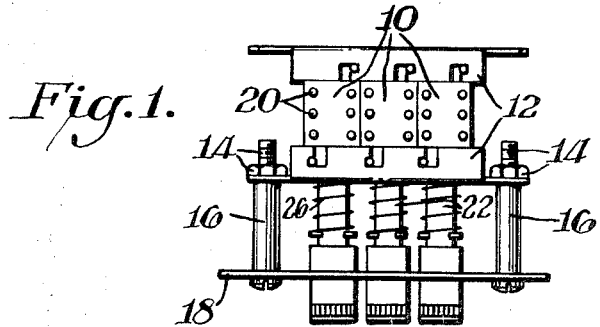
Fig.1.
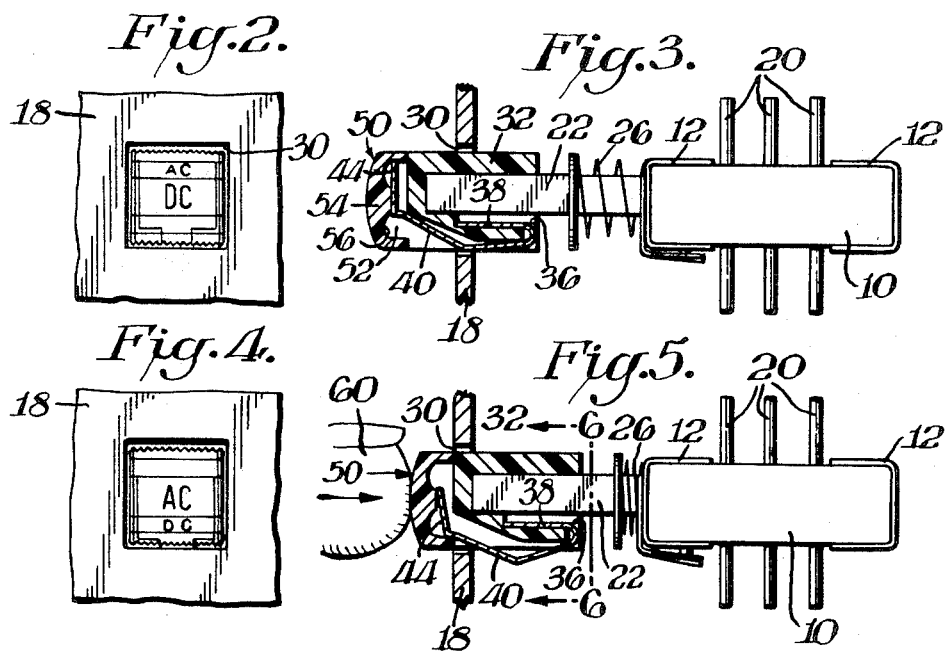
Fig.2.    Fig.3.
Fig.4.    Fig.5.
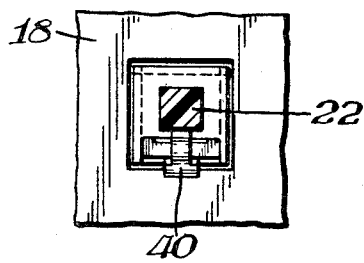
Fig.6.
INVENTOR
Lawrence A. Gammill
BY
Mortenson and Weigel
ATTORNEYS

CONDITION INDICATOR

BACKGROUND OF THE INVENTION

Switches and other condition devices used in electronic, as well as other, instrumentation often are of the two-position pushbutton type. Desirably some means must be had of permitting the observer to readily ascertain the position or condition of the switch. This condition may be indicated by a light in the face of the switch which is electronically "lit" when the switch is in one condition or the other. Obviously, while such technique of indication is generally satisfactory, it is unnecessarily expensive and subject to the replacement problem incurred by the necessity of replacing the light bulbs. Another factor of some significance is the additional power required for such indication. It would be far more desirable to provide a pushbutton-operated switch which can provide a visual indication of the switch without necessitating any external power source or, for that matter, requiring any additional space within the switch itself.

It is, therefore, an object of this invention to obviate many of the disadvantages of the prior art switch condition indicators.

Another object of this invention is to provide an improved condition-indicating device.

DESCRIPTION OF THE PREFERRED EMBODIMENT

In a preferred embodiment of the invention, a device for visually displaying the position of a part includes a lens having a magnifying portion, a display flag positioned to be viewed through the lens, and a positioning means associated with the part whose condition, or position, is to be indicated for operating the display flag and the lens relative to each other in accordance with the condition of the part, thereby to permit the viewing of the different portions of the flag through the lens. That portion of the display flag behind the magnifying portion of the lens will be highly emphasized to the viewer. In another embodiment of the invention an adjacent portion of the lens is formed to have a reducing lens thus to further deemphasize portions of the flag adjacent the magnifying portion of the lens.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will be best understood from the following description when read in connection with the accompanying drawings in which:

FIG. 1 is a plan view of a pushbutton assembly mounted on the front panel of an instrument housing;

FIG. 2 is a front elevation view of one of the pushbuttons;

FIG. 3 is a sectional side elevation view of the pushbutton illustrated in FIG. 2;

FIG. 4 is a partial front elevation view of the pushbutton illustrated in FIG. 2 in a second condition of operation;

FIG. 5 is a sectional side elevation view of the pushbutton illustrated in FIG. 4; and FIG. 6 is a sectional view of the pushbutton of FIG. 5 taken from the backside of the instrument panel along the section lines 6–6.

BRIEF DESCRIPTION OF THE PREFERRED EMBODIMENT

There may be seen in FIG. 1 three detent-controlled, two-position pushbutton switches 10. The three switches 10 are enclosed within holding clamps 12. These holding clamps in turn are mounted by nuts and bolts 14, using spacing collars 16, to the front panel 18 of what may be an electronic instrument housing or other assembly. The switches 10 have electrical terminals 20, to which electrical wires may be soldered to otherwise attached, and actuating arms 22. The operation of the switches is conventional and is such that when the actuating arm 22 is moved upwardly, in the drawing, the connections to the terminals 20 are made or broken and the actuating arm 22 is locked by a detent mechanism (not shown in the drawing of FIG. 1 but the exterior portion of which may be seen in both FIGS. 3 and 5) designated by the reference numeral 24. This condition maintains until the actuating arm 22 is again moved upwardly, in the drawing, to relieve the detent and the actuating arm is permitted to return, due to the action of the return springs 26, to its fully extended position. Thus far the apparatus described is entirely conventional.

In accordance with this invention the ends of the actuating arms 22 of the switches 10, which arms extend through an aperture 30 in the front panel 18, each have positioned thereover a hollow generally rectangular support member 32 which may be formed of any suitable material. Preferably the support member is molded from a suitable plastic. The support member 32 is sized to provide a friction fit or is otherwise attached to the end of the actuating arm 22. The lower wall (in the drawing) of the housing 32 is slotted, as at 36, to accommodate the U-shaped end portion 38 of a display flag member 40. The U-shaped portion, which forms one end of the display flag 40, is inserted into the open, wall portion of the member 32 and extends to the left in the drawing (to the front of the panel 18) ending with an upright portion 44. The upright portion may have imprinted thereon material representing the condition of the switches 10, such as AC denoting alternating current or DC denoting direct current as is most clearly seen in FIGS. 2 and 4. The flag member may be formed of a suitable spring steel.

To complete the assembly, a lens 50 having a generally C-shaped cross section is attached to the end of the housing member 32. For this purpose the housing member 32 is formed to have stepped portions 52 which accommodate the lens 50. The lens 50 may be formed of plastic or other suitable material. The lens itself is formed to have a convex or magnifying portion 54 in the central portion thereof to magnify, as seen in FIG. 2, the words DC when the flag 44 is in the position of FIG. 3 and conversely to magnify the letters AC imprinted on the upper portion of the flag 44 when the flag is dropped to the position illustrated in FIGS. 4 and 5. Immediately above and below the convex portion 54 are formed concave portions 56 of the lens 50 to reduce the visual image of the flag seen by the viewer from the front of the panel 18.

In operation, it may be assumed that, with the switch in the position having its armature 22 extended, as seen in FIGS. 2 and 3, the cam follower 40 engages the lower edge of the aperture 30 which provides a camming action to force the cam follower and hence the flag 44 upwardly in the drawing. The letters AC which are printed upon the upper portion of the flag, are adjacent the reducing portion of the lens. Because of this condition, the letters AC appear greatly reduced in size whereas the letters DC behind the magnifying portion of the lens are greatly enlarged. This denotes that the switch, controlled by the armature 22, is in the condition whereby a DC signal, for example, is connected through the switch.

Assume now that the pushbutton is depressed, as by a person's finger 60 illustrated in FIG. 5. The detent in the switch 10 holds the armature 22 at this inward position with the spring 26 compressed. The switch condition is now such as to connect an AC signal, for example, through the switch. This movement of the armature 22 to the right in the drawing permits the spring-loaded cam follower 40 to be released, thereby lowering the display flag 44 to the point where the letters AC appearing on the upper portion of the flag, are behind the magnifying portion of the lens and conversely, the letters DC are contiguous the reducing portion of the lens. Hence, when viewed from the front of the panel 18, the letters AC appear greatly enlarged whereas the letters DC greatly diminished in size.

When the pushbutton is again actuated, as by depressing, the armature 22 returns to the extended position illustrated in FIG. 3. This operation sequences as many times as the pushbutton is depressed to position the symbols which denote the switch's condition behind the magnifying region of the lens. It may be noted that although the usage of this device is illustrated in conjunction with the pushbutton, it may be used in conjunction with any switch or other member having two or, for that matter, more positions. All that need be done is to have a flag attached to that portion of the switch which is moved according to the device's condition. In this manner, any letters imprinted upon the display flag may then be moved into or out of the magnifying portion of a lens.

The display mechanism thus illustrated is extremely simple to construct, requires no electrical energization, and provides a relatively economical means of displaying the condition of a device.

It is obvious that many embodiments may be made of this inventive concept and that many modifications may be made in the embodiments hereinbefore described. Therefore, it is to be understood that all descriptive matter herein is to be interpreted merely as illustrative, exemplary, and not in a limited sense. It is intended that various modifications which might readily suggest themselves to those skilled in the art be covered by the following claims, as far as the prior art permits.

I claim:

1. In a pushbutton assembly wherein the pushbutton has first and second positions and is operated through an aperture in a wall, a device for visually displaying said positions comprising:

a housing adapted for movement between said first and second positions along an axis substantially perpendicular to said wall, said housing having an apertured side portion;

a lens attached to an end of said housing, said lens having a magnifying portion and a reducing portion;

a springlike member having a first end secured in said housing, a second flag-shaped end disposed in said housing adjacent to said lens, and a central portion having a camming surface extending through the aperture in the side portion of said housing;

said flag-shaped end having first and second indicia-bearing portions which are simultaneously displayed through said lens;

said first and second indicia-bearing portions being moved into position for display through the magnifying and reducing portions of said lens, respectively, by the engagement of said camming surface with the edge of the aperture of said wall when the pushbutton is moved into said first position, thereby to emphasize the display of said first indicia-bearing portion and deemphasize the display of said second indicia-bearing portion; and said second and first indicia-bearing portions being moved into position for display through the magnifying and reducing portions of said lens, respectively by the disengagement of said camming surface from the edge of the aperture of said wall when the pushbutton is moved into said second position, thereby to emphasize the display of said second indicia-bearing portion and deemphasize the display of said first indicia-bearing portion.

2. A device according to claim 1 wherein the reducing portion of said lens is divided into two reducing sections respectively adjacent to opposite sides of said magnifying portion, said second indicia-bearing portion being moved into position for display through one of said two reducing sections by the engagement of said camming surface with the edge of the aperture of said wall, and said first indicia-bearing portion being moved into position for display through the other of said two reducing sections by the disengagement of said camming surface from the edge of the aperture of said wall.

3. A device according to claim 1 further including detent means secured to said wall for maintaining said pushbutton in either of said first and second positions relative to said wall.

4. A device according to claim 1 wherein said lens forms the front portion of said pushbutton.